Patented Sept. 5, 1944

2,357,570

UNITED STATES PATENT OFFICE 2,357,570

USING COMMINUTED CATALYSTS SUPPORTED ON A METALLIC BASE

Gale L. Adams, San Marino, Calif., assignor to Socony-Vacuum Oil Company, Incorporated, New York, N. Y., a corporation of New York No Drawing. Application May 25, 1942,
Serial No. 444,485

2 Claims. (Cl. 196—28)

In various processes in which a vapor or gas is contacted with a solid reagent or catalyst, difficulty is often experienced, and undue cost incurred, by reason of the occurrence of the solid in only a finely divided form.

For example, in the process described in the copending application of Jan G. Schaafsma, filed simultaneously herewith under Serial No. 444,494 and entitled "Removal of mercaptan sulfur from petroleum distillates," petroleum vapors are contacted with solid calcium hydroxide at a temperature usually exceeding 800° Fahr. Other things being equal, the effectiveness of this process is at the maximum when hydration of the lime is complete, but complete hydration of quick-lime reduces it in large part to the form of a fine powder which is extremely difficult to contact with a vapor stream because of the impermeability of a bed or layer formed from it. Recourse is therefore had to pelletizing the powder or to a partial hydration of granular quicklime which permits it to retain the granular form but materially lowers its efficiency in the process.

In the use of this granular or pelletized lime, only the exterior portion of the particle is effective in the reaction by which sulfur is removed, and for all practical purposes the lime is spent when only perhaps twenty percent of its weight has been utilized in sulfur reaction. In this particular instance the spent lime cannot be recovered by burning because of the calcium sulfids which it contains, and the utilization of so small a proportion of the agent constitutes an undue and important burden on the process.

In catalytic processes for cracking petroleum in the vapor phase, acid treated clays and clay-like synthetic materials are widely used as catalysts. These bodies also occur in finely divided form and must be made into pellets to provide a vapor-permeable contact bed. Unlike the lime of the above illustration, these bodies may as a rule be regenerated by burning off the accumulated carbon, but in the more modern forms of these vapor-phase processes the contacting step is performed in a downwardly moving column of the pellets which are diverted to a separate apparatus to be regenerated. In this step there is considerable loss of weight by dusting due to attrition, and this loss is a proportion, not of the total weight of the pellet, but of the weight of only that relatively shallow outside layer which is largely functional in the catalysis. In other words, the use in a continuous catalysis of a pelletized catalyst involves the transference through all the steps of the process of a quantity of catalyst which is very large as compared with the quantity which is actually utilized.

I have discovered that treating agents of the above types, which are substantially water-insoluble solids, occurring in the form of a fine powder or even such as may readily be reduced from the massive to the powdered form, may be utilized to great advantage in the form of relatively thin coatings on a metallic foundation.

The foundation units should be of small dimensions, usually not exceeding one inch in any direction, and should be of such external form that they will flow in the contacting chamber to form a uniform but freely permeable contact mass. The units should also afford the largest possible surface area per unit of occupied volume, and should be of such form that the largest possible proportion of the total area is protected against attrition by which the coating may be dislodged. A particularly suitable form consists of a thin metallic ribbon, from ½ inch to 1 inch in width, wound into a clock-spring spiral not exceeding 1 inch in diameter, the turns of this spiral being so spaced as to permit the coating slurry to drain from between them and to permit the free penetration of vapors to the entire coated area. Thin expanded metal lath or small tubes of coarse wire mesh may also be cut into short lengths for the same purpose.

The metal of which these units are composed may be sheet iron or steel, copper, brass, Monel or any other metal which is not seriously attacked by the vapors nor softened at the temperature of vapor contact.

In applying this step to the use of lime as a vapor-treating agent I water-slack quicklime to produce a rather thick slurry, place a large number of the units loosely in a wire-mesh basket, immerse the basket and its contents in a bath of the slurry, agitate the bath (preferably by circulation) to displace air bubbles, lift the mass from the bath and allow it to drain. The basket and its contents are then dried in a current of air (preferably heated), the calcium hydroxide remaining on the metallic surfaces in the form of a dry coating, the thickness of which may be controlled by varying the concentration of the slurry.

Clay-like catalysts having even a slight degree of plasticity may be applied to the foundation in the manner above described, but in the use of materials devoid of plasticity, such for example as magnesian minerals of the sepiolite class or acid-digested montmorillonites, it may be necessary to introduce into the slurry a minute proportion of a suitable binder. The nature of this binder will depend largely on the temperature at which the vapor contact is to be performed. For low temperatures, not exceeding say 250° Fahr., a water-soluble organic binder may be used, as for example molasses or glue. For higher temperatures, a trace of sodium silicate may be used, or a small proportion of a highly plastic clay or bentonite. The binding agent, if used, must be inert to the particular reaction or catalysis contemplated and must not be decomposed at the desired contacting temperature.

When the drying step has been completed, the contents of the basket are dumped into a bin or onto a platform from which the coated units may be charged to the contacting vessel, any treating agent dislodged in this step being returned to the slurry tank.

When the usefulness of the coatings has been expended in the contacting step, the units, still coated with spent agent, are dropped at the highest possible temperature into a body of water maintained at a materially lower temperature, or, alternatively, they may be cooled by sprays or streams of water. Whatever method is used, cooling should take place as rapidly as possible. In this step the water dissolves or disperses any binder which may have been used while the sharp contraction of the metallic base produced by the sudden lowering of temperature causes spalling of the coatings by which at least the greater part of the spent agent is dislodged. The final step is to rinse the units thoroughly, after which they are returned to the slurry tank for a renewed coating as above described.

The optimum thickness of coating of any given treating agent is the thickest which will permit the substantially complete utilization of the agent: by chemical combination, in the case of lime, or by fouling in the case of a true catalyst. It will be evident that this maximum thickness obtains the desired treating effect with the minimum circulation of the metallic units through the steps of coating, drying, and removal of spent agent.

I claim as my invention:

1. In an operation requiring the application of a solid, substantially water-insoluble treating agent to a current of heated vapor, a cyclic method of making said application, comprising: coating the surfaces of metallic units having a high relation of superficial area to occupied volume with an aqueous slurry of said agent and drying the coated surfaces; contacting said coated units with said vapor and thereby substantially exhausting the activity of said agent; cleaning the exhausted coatings from said units by sudden chilling thereof, and returning the cleaned units to said coating step to pass again through said cycle.

2. A cyclic method of handling comminuted, substantially water-insoluble catalysts through a continuous vapor-contacting operation, comprising: coating the surfaces of metallic units having a high relation of superficial area to occupied volume with films of said catalyst; contacting the coated units with a stream of said vapor at a high temperature and thereby substantially exhausting the activity of said catalyst; contacting the exhausted units in highly heated condition with cold water and thereby spalling said films from said units, and returning the cleaned units to said coating step to pass again through the cycle.

GALE L. ADAMS.